July 16, 1963 E. W. MOULTON 3,098,206

WAVE BAND UHF OUTPUT NETWORK

Filed May 20, 1960

INVENTOR.
ERIC W. MOULTON
BY
T. L. Styner
ATTORNEY.

United States Patent Office 3,098,206
Patented July 16, 1963

3,098,206

WAVE BAND UHF OUTPUT NETWORK

Eric W. Moulton, Cincinnati, Ohio, assignor to General Dynamics Corporation, Rochester, N.Y., a corporation of Delaware Filed May 20, 1960, Ser. No. 30,521
5 Claims. (Cl. 333—73)

The present invention relates generally to broad band tuned circuits and is more particularly concerned with a tuned output network for use in ultra high frequency circuits where it is desired to pass a wide band of frequencies without adjustment of the tuned circuit.

A primary object of the present invention is to provide a small, compact, easily packaged unit for use as a broad band tuned network in UHF circuits. This is accomplished by providing primary and secondary coaxial tuned circuits coupled together and having a common outer shield. Since the output network employs a common outer shield for the primary and secondary conductors, it is characterized not only by the usual advantages of coaxial tuned circuits with respect to very low losses, freedom from substantial external radiation, high stability, and the like, but also by a very simple mechanical structure.

Another object of the invention is to provide a tuned circuit of the type described wherein the tuning may be effected very simply by adjustment of a minimum number of controls. This object is achieved by providing first for adjustment of the coupling between the primary and secondary circuits merely by altering the spacing between the inner conductors of the coaxial lines and second for adjustment of the position of an output tap on the secondary circuit to alter the loading. These adjustments are effective to provide a transformer having very broad frequency response with a maximum of two frequency peaks.

A further object is to provide a network of this type which is well suited for use of a plate load in UHF amplifiers especially those employing conventional grounded grid tubes.

The invention has for another object the provision of an output network having all of the desirable characteristics described above and which is also effective to match the output impedance of a grounded grid vacuum tube to a conventional 50 ohm coaxial cable.

The invention, both as to its organization and method of operation, together with further objects and advantages, will best be understood by reference to the following detailed description taken in conjunction with the accompanying drawing wherein.

Figures 2, 3, 4:
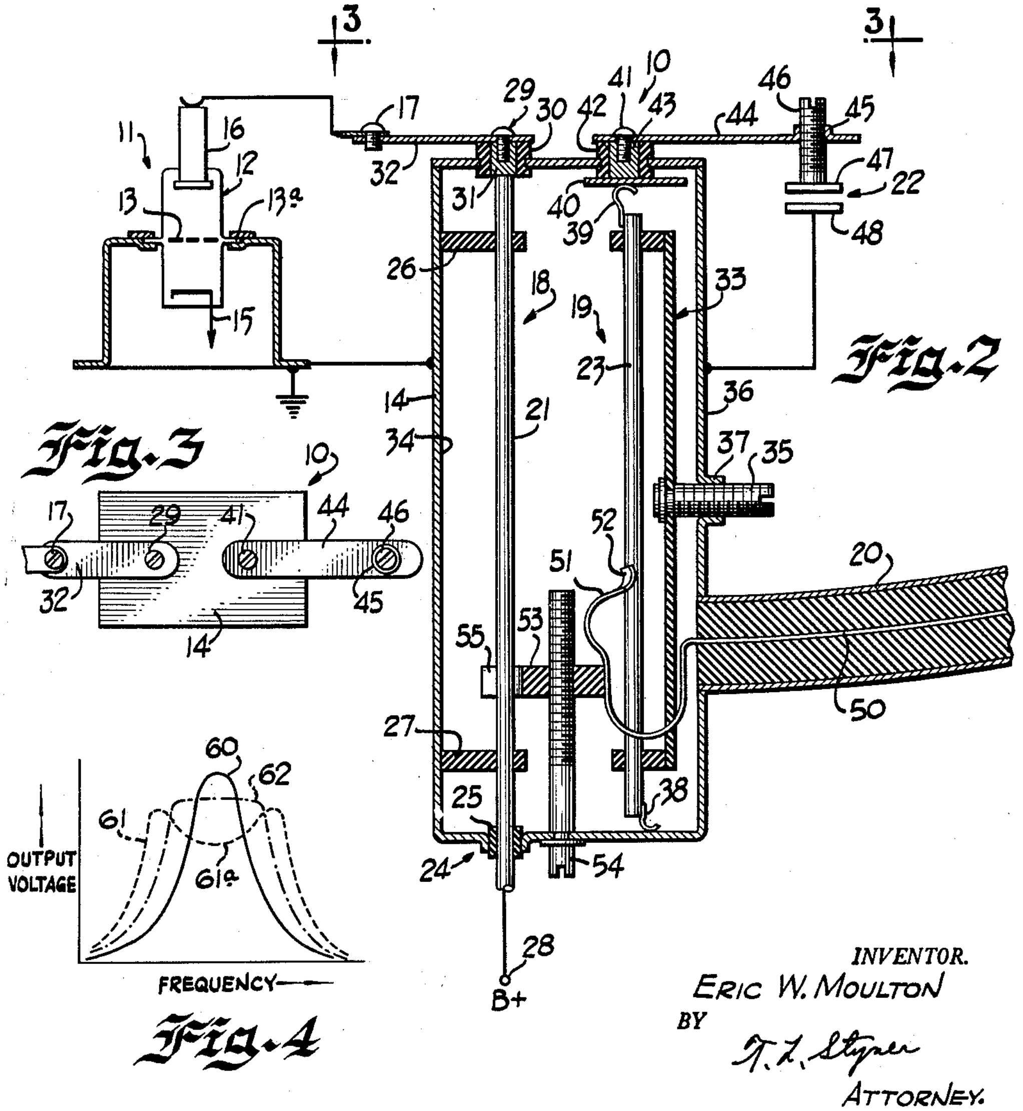
FIG. 2 is a sectional view illustrating a tuned circuit characterized by the features of the present invention.
FIG. 3 is a top view of the tuned circuit shown in FIG. 2 looking in the direction of the arrowheaded lines 3—3 and assuming that FIG. 2 shows the entire tuned circuit.
FIG. 4 shows a set of typical frequency response curves that may be obtained from the amplifier shown in FIG. 1 by adjustment of the output tuned circuit.

Referring now to the drawing and first to FIG. 2, the tuned network of the present invention is there identified generally by the reference numeral 10 and is illustrated in use as a plate load for an ultra high frequency amplifier 11. The latter amplifier may be of any conventional type and is illustrated as including a vacuum tube 12 having a control grid 13 with a flange 13a thereon electrically and mechanically connected to the casing or outer shield 14 of the network 10. The latter shield is, of course, at ground potential so that the vacuum tube 12 is of the conventional grounded grid type. However, it should be recognized that the network of the present invention is not confined to use with grounded grid triodes. Excitation or input signals for the amplifier 11 are supplied to the cathode 15 of the tube 12 while the plate 16 of the tube is connected directly to an input terminal 17 of the network 10. The input signals may be either wide band pulsed signals or continuous waves having a single frequency which may lie at any point within a predetermined band or range.

Figure 1:
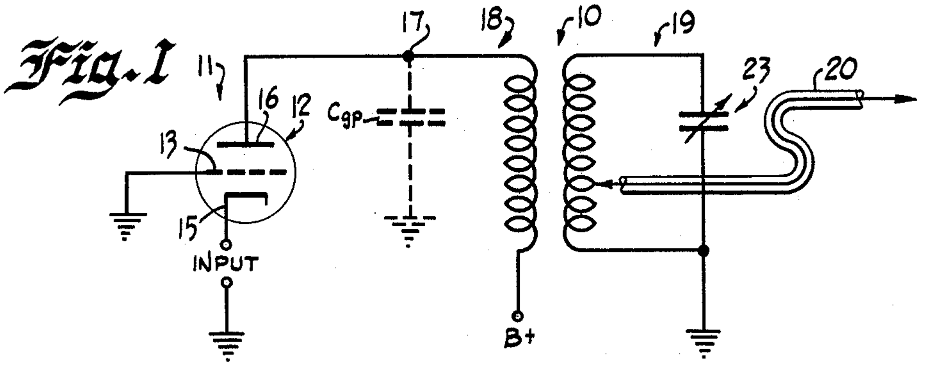
FIG. 1 is a schematic diagram illustrating the equivalent circuit of an ultra high frequency amplifier employing the tuned circuit of the present invention.

In accordance with the present invention the network 10 comprises a primary tuned circuit 18 forming the output for the amplifier tube 12 and a loaded secondary circuit 19 coupled to the primary circuit. The primary and secondary circuits are actually coupled quarter wavelength coaxial lines respectively loaded by the tube output impedance and by the impedance of an output cable 20 which is preferably a conventional 50 ohm coaxial cable. The primary circuit is formed by a conductor or rod 21 extending within the outer shield 14 and of such length that at its upper end the coaxial line formed thereby looks like an inductance. To this end, the conductor 21 is somewhat less than a quarter wavelength of the input signal with the length being such that the inductance resonates with the tube capacity or, more specifically, with the capacity between the plate 16 and the control grid 13 which capacity is designated in FIG. 1 as $C_{gp}$. The secondary circuit 19 consists of a lumped adjustable trimmer capacitor 22 and a coaxial line formed by a conductor or rod 23 extending parallel to the primary conductor 21 within the common outer shield 14. Here again, the length of the conductor 23 is such that the line look slightly inductive and resonates with the trimmer capacitor. The latter capacitor is adjusted to provide a capacity equal to the grid to plate capacitance $C_{gp}$ of the tube 12.

D.C. voltage for the plate of the tube 12 is supplied via a feed-through bypass capacitor 24 at the lower end of the network 10. The latter capacitor is formed between the primary conductor 21 and a portion of the casing or shield 14 with the dielectric consisting of a sheet of insulating material 25 such as mica. The capacitor 24, of course, provides a bypass to ground for high frequency signals.

The primary conductor 21 is mounted in fixed position within the grounded outer shield or casing 14, for example, by employing fixed insulating support blocks 26 and 27 affixed to the interior of a side wall 34 of the shield. Alternatively, the primary conductor may comprise a printed circuit conductor formed in any suitable manner on an insulating board or strip. In any event, the lower end of the conductor 21 is connected directly to the B+ or D.C. supply terminal 28 while the upper end is connected through an appropriate terminal assembly 29 to the terminal 17. The terminal assembly may comprise an insulating ring or grommet 30 seated within an opening in the top of the shield and surrounding a conducting insert 31 secured on one side to the conductor 21 and secured on the other side to a conducting finger 32 supporting the terminal 17.

Similarly, the secondary conductor may comprise a printed circuit conductor formed either on the same or a different insulating strip from the primary conductor 21. As shown, however, the secondary conductor or rod 23 is mounted for movement within the shield 14 to alter the coupling between the primary circuit 18 and the secondary circuit 19. To this end, the conductor is carried upon an insulating support 33 which is, in turn, mounted upon an adjusting screw 35 threaded into a tapped opening 37 in the side wall 36 of the shield. The screw 35 may be turned by a suitable tool such as a screw driver to move the support 33 laterally of the shield toward or away from the fixed primary conductor 21. The connection between the support 33 and the inner end of the screw 35 permits the latter to rotate freely without turning either the conductor 23 or its support. When the conductor 23 moves towards the fixed conductor 21 the coupling between the primary and secondary circuits 18 and 19 is increased while reverse movement of the conductor 23 obviously decreases the coupling. The lower end of the conductor 23 carries a spring finger or wiper 38 which engages the bottom of the shield 14 thus forming the secondary coaxial line with one end shorted. The upper end of the conductor 23 also carries a spring finger or wiper 39 engaging a fixed contact plate 40 electrically connected to one plate of the trimmer capacitor 22 through a contact assembly indicated generally by the reference numeral 41. The latter assembly may comprise an insulating ring or grommet 42 inserted through a second opening formed in the top of the shield or casing 14 together with a conducting contact or insert 43 secured on one side to the plate 40. The upper side or face of the contact 43 is connected to a conducting finger 44 having a tapped bore 45 therein for accommodating an adjusting screw 46. The screw 46 carries one plate 47 of the trimmer capacitor 22 and, hence, it may be turned to alter the capacity between the plate 47 and the other capacitor plate 48 which is grounded by connection directly to the casing 14. While the capacitor 22 is illustrated as having an air dielectric this is not necessary to the present invention.

The output from the network 10 is derived via the output cable 20 which has an inner conductor 50 tapped to the coaxial secondary line 23 near the short circuited end. To this end, the inner end of the conductor 50 is connected to a spring contact 51 which has a curved wiper portion 52 in engagement with the conductor 23. The position of the output tap may be adjusted to control the loading on the secondary circuit and, to this end, the contact 51 is mounted upon an insulating block 53 which is movable longitudinally of the shield 14. The latter movement is accomplished through an adjusting screw 54 preferably formed of insulating material and threaded through a tapped bore in the block 53. The screw 54 is mounted for free rotation upon the bottom of the shield 14 and, when it is turned, the block 53 moves therealong since this block is prevented from rotating due to the fact that it has a bifurcated end portion 55 embracing the fixed conductor 21. The direction of movement of the block 53 and the wiper which it carries is, of course, a function of the direction of rotation of the screw 54.

In view of the foregoing description, it will be observed that the coupling between the primary and secondary circuits 18 and 19 may be adjusted by turning the screw 35 to provide a desired response. Thus, if the coupling between these circuits is very loose, the response may be made fairly sharp or commensurate with that which may be obtained from a single tuned circuit. A typical response curve, that is, a curve of output voltage versus frequency, which may be obtained with a loose coupling between the primary and secondary circuits is represented by the solid line curve 60 in FIG. 4. If the coupling is increased by decreasing the spacing between the conductors 21 and 23, the circuit may be made to behave as a double tuned circuit having a maximum of two peaks and, in such case, the output response curve will resemble the dashed line curve 61 shown in FIG. 4. Thus, the coupling between the primary and secondary circuits may be adjusted to provide the desired band width. The coupling is, of course, a function not only of the spacing between the conductors but also of the characteristic impedances of the primary and secondary coaxial lines considered individually and of the length of the coaxial line with both the primary and secondary circuits resonant. However, since the latter factors are fixed for any particular unit the coupling for that unit is adjusted solely by altering the spacing between the conductors.

The tap point of the spring contact 51 along the conductor 23 controls the loading and, hence, governs the response level between the two peaks at the edges of the response band. Thus, the tap point controls the level of the point 61a on the curve 61 shown in FIG. 4. By proper adjustment of the coupling and the tap point the response may be made substantially flat over a wide band or frequency range so that the output response curve will have the appearance of the curve 62 shown in FIG. 4. In one form of the invention which was found to provide satisfactory results the network described was found to provide broad band response over a 12% band width at a frequency of 540 megacycles when feeding to a 50 ohm output cable.

In view of the foregoing description it will be recognized that since the network employs coaxial lines for the primary and secondary tuned circuits it is characterized by very low losses, high stability, low external radiation due to the excellent shielding, freedom from parasitic oscillations, and the like. The use of a common outer shield or casing for the primary and secondary lines simplifies the mechanical construction and gives rise to a small, compact, easily packaged unit which is especially useful in equipment where miniaturization is a prime factor. The transformer may be adjusted very easily and without resort to tedious, delicate adjustments to provide any desired frequency response with a maximum of two peaks. The transformer is capable of matching the impedance of conventional vacuum tubes to an ordinary 50 ohm output cable and, hence, does not require the use of special, highly expensive components in the circuits in which it is used.

While the present invention has been described in connection with the details of a particular embodiment thereof, it should be understood that these details are not intended to be limitative of the invention since many modifications will be readily apparent to those skilled in this art and it is, therefore, contemplated in the accompanying claims to cover any such modifications as fall within the true spirit and scope of the invention.

What is claimed as new and desired to be secured by Letters Patent of the United States is:

1. A transformer comprising tuned primary and secondary circuits, the primary circuit comprising a coaxial line section formed by a primary conductor disposed within an outer conducting shield, the secondary circuit comprising a coaxial line section formed by a secondary conductor disposed within said shield parallel to and spaced from said primary conductor, said secondary conductor having one end connected to said shield to form a short circuited end for its coaxial line section, said primary and secondary conductors being movable relative to each other to adjust the coupling between said primary and secondary circuits, and an output coaxial cable with a center conductor connected to said secondary conductor and means for moving the connection therealong to control the loading on said transformer.

2. The transformer defined by claim 1 wherein each of said primary and secondary conductors is of such length that the coaxial line sections appear inductive at one end thereof.

3. A transformer comprising tuned primary and secondary circuits, the primary circuit comprising a coaxial line section formed by a primary conductor disposed within an outer conducting shield, the secondary circuit comprising a coaxial line section formed by a secondary conductor within said shield extending parallel to and spaced from said primary conductor, said secondary conductor having one end connected to said shield to form a short circuited end for its coaxial line section, and an output cable connected to a point on said secondary conductor intermediate the ends of the secondary conductor to establish optimum loading on the transformer and to obtain substantially flat response over a wide frequency range.

4. The transformer defined by claim 3 wherein each of said primary and secondary conductors is of such length that the coaxial line sections appear inductive at one end thereof.

5. A transformer comprising a tuned primary circuit responsive to an input signal and a tuned secondary circuit, the primary circuit comprising a first coaxial section formed by a primary conductor disposed within an outer conducting shield and having a length somewhat less than an odd number of quarter wavelengths of said input signal so that said first section appears as an inductance at the end thereof adjacent said one end of said primary conductor, the secondary circuit comprising a second coaxial line section formed by a secondary conductor disposed within said shield and spaced from said primary conductor, said secondary conductor having one end connected to said shield to form a short circuited end for its coaxial line section, said secondary conductor having a length somewhat less than an odd number of quarter wavelengths of said input signal so that said second line section appears inductive at the end opposite to said short circuited end, the coupling between said primary and secondary circuits being a function of the spacing between said primary and secondary conductors, and an output cable connected to said secondary conductor intermediate the ends of the secondary conductor, the loading on said transformer being controlled by the position of the connection of said cable to said secondary conductor.

References Cited in the file of this patent

UNITED STATES PATENTS

| | | |
|---|---|---|
| 2,275,587 | Gluyas | Mar. 10, 1942 |
| 2,647,947 | Downey | Aug. 4, 1953 |
| 2,762,987 | Mackey | Sept. 11, 1956 |
| 2,913,681 | Lyman | Nov. 17, 1959 |